United States Patent
Durrani et al.

(10) Patent No.: US 7,765,625 B2
(45) Date of Patent: Aug. 3, 2010

(54) FLUSH TOILET ASSEMBLY

(75) Inventors: Sheryar Durrani, West Bloomfield, MI (US); Greg Exner, Woodhaven, MI (US); William R. Cohoon, Canton, MI (US)

(73) Assignee: Thetford Corporation, Ann Arbor, MI (US)

( * ) Notice: Subject to any disclaimer, the term of this patent is extended or adjusted under 35 U.S.C. 154(b) by 310 days.

(21) Appl. No.: 11/674,847

(22) Filed: Feb. 14, 2007

(65) Prior Publication Data

US 2007/0192951 A1    Aug. 23, 2007

Related U.S. Application Data

(60) Provisional application No. 60/774,891, filed on Feb. 17, 2006, provisional application No. 60/826,952, filed on Sep. 26, 2006.

(51) Int. Cl.
  *E03D 11/14* (2006.01)
(52) U.S. Cl. .................... 4/252.1; 4/441; 4/434
(58) Field of Classification Search ............ 4/252.1, 4/441, 434
  See application file for complete search history.

(56) References Cited

U.S. PATENT DOCUMENTS

| | | | |
|---|---|---|---|
| 2,068,406 A * | 1/1937 | Freed | 4/378 |
| 3,308,481 A * | 3/1967 | O'Brien et al. | 4/325 |
| 3,599,248 A * | 8/1971 | Fulton et al. | 4/438 |
| 3,860,973 A * | 1/1975 | Uyeda et al. | 4/332 |
| 3,939,501 A | 2/1976 | Sargent | |
| 3,949,430 A | 4/1976 | Miller et al. | |
| 4,032,996 A | 7/1977 | Sargent et al. | |
| 4,145,773 A | 3/1979 | Sargent et al. | |
| 4,180,876 A | 1/1980 | Sargent et al. | |
| 4,185,337 A | 1/1980 | Sargent et al. | |
| 4,185,340 A | 1/1980 | Sargent et al. | |
| 4,192,027 A | 3/1980 | Sargent et al. | |
| 4,215,445 A | 8/1980 | Antos et al. | |
| 4,217,668 A | 8/1980 | Sargent et al. | |
| 4,589,148 A | 5/1986 | Cameron | |
| 4,710,988 A * | 12/1987 | Stewart | 4/438 |
| 4,776,631 A | 10/1988 | Sargent et al. | |
| 4,805,660 A | 2/1989 | Antos et al. | |
| 4,850,064 A | 7/1989 | Cameron | |
| 4,888,832 A | 12/1989 | Cameron | |
| 4,926,508 A | 5/1990 | Sargent et al. | |

(Continued)

*Primary Examiner*—Gregory L Huson
*Assistant Examiner*—Karen Younkins
(74) *Attorney, Agent, or Firm*—Harness, Dickey & Pierce, P.L.C.

(57) ABSTRACT

A flush toilet assembly includes a bowl assembly defining a bowl and a base supporting the bowl assembly. One of the bowl assembly and the base may include a male coupling element and the other may include a cooperating female coupling element. A flush lever may be interconnected to the base for movement between first and second positions and may include a cam surface. A water valve may include a cam follower associated with the cam surface and may be moveable from a closed to an open position through cooperative engagement of the cam surface and cam follower in response to movement of the flush lever from the first to the second position. The base may integrally define a flush water path extending between an inlet port and an outlet port. The water valve may be disposed within a recess defined by the base which intersects the flush water path.

11 Claims, 12 Drawing Sheets

U.S. PATENT DOCUMENTS

| | | |
|---|---|---|
| 4,944,048 A | 7/1990 | Sargent et al. |
| 4,974,899 A | 12/1990 | Sargent |
| 4,982,456 A | 1/1991 | Cameron |
| 5,010,602 A | 4/1991 | Sargent et al. |
| 5,031,249 A | 7/1991 | Sargent |
| 5,056,166 A | 10/1991 | Sargent et al. |
| 5,060,320 A | 10/1991 | Sargent et al. |
| 5,073,994 A | 12/1991 | Sargent et al. |
| 5,557,810 A | 9/1996 | Antos et al. |
| 5,715,544 A | 2/1998 | Huffman et al. |
| 5,875,499 A | 3/1999 | Hoffman et al. |
| 5,906,011 A * | 5/1999 | Fleming .................. 4/329 |
| 6,158,061 A | 12/2000 | Cameron et al. |
| 6,397,405 B1 | 6/2002 | Grech et al. |
| 6,584,623 B2 | 7/2003 | Grech et al. |
| 6,848,723 B2 * | 2/2005 | Lamich .................. 285/319 |
| 6,871,361 B2 | 3/2005 | Grech et al. |
| 7,293,298 B2 | 11/2007 | Cameron et al. |
| 2007/0240772 A1 | 10/2007 | Durrani |
| 2008/0047053 A1 | 2/2008 | Grech et al. |

* cited by examiner

FLUSH TOILET ASSEMBLY

CROSS-REFERENCE TO RELATED APPLICATIONS

This application claims priority to U.S. Provisional Patent Application No. 60/774,891 filed Feb. 17, 2006 and U.S. Provisional Patent Application No. 60/826,952 filed Sep. 22, 2006, which applications are herein expressly incorporated by reference.

INTRODUCTION

Vehicles, including recreational vehicles ("RVs"), airplanes, boats, trains and the like, often include toilets for the comfort and convenience of the passengers. The toilets of vehicles must be designed for use environments that are significantly different from non-transitory toilets conventionally found in homes and businesses ("home toilets"). Vehicle toilets should also provide the user with features common to home toilets.

One example of a vehicle toilet is shown and described in commonly assigned U.S. Pat. No. 6,397,405 which is hereby incorporated by reference as if fully set forth herein. U.S. Pat. No. 6,397,405 discloses various embodiments having a bowl portion and a base portion unitarily constructed of a common material. The integrally formed base portion varies in height depending on the particularly intended use environment. In this regard, in certain embodiments the base is configured for a high-rise application in which the toilet is to be directly supported on a floor. In other embodiments, the base is configured for a low-rise application in which the toilet is to be supported on a platform elevated from the floor.

While known toilets, including the toilet disclosed by U.S. Pat. No. 6,397,405, have proven acceptable for their intended applications, there remains a need for continuous improvement in the pertinent art.

SUMMARY

According to one aspect, the present teachings provide a flush toilet assembly for a motor vehicle comprising a bowl assembly defining a bowl and a discharge opening at a lower end of the bowl and a base coupled to the bowl assembly. One of the bowl assembly and the base includes at least one male coupling element. The other of the bowl and the base includes at least one cooperating female coupling element.

According to another aspect, the present teachings provide a housing integrally defining a flush water path. The flush water path extends between an inlet port and an outlet port. The housing further defines a water valve recess. The water valve recess intersects the flush water path. A water valve is mounted in the water valve recess for movement between a first water valve position and a second water valve position. In the first water valve position, the flush water path is closed. In the second water valve position, the flush water path is open.

According to yet another aspect, the present teachings provide a flush toilet including a base, an actuator and a water valve and a flush lever. The flush lever is interconnected to the base for movement between a first position and a second position and includes a cam surface. The water valve is carried by the base. The water valve includes a cam follower associated with the cam surface and is moveable from a water valve closing position to a water valve open position through cooperative engagement of the dam surface and cam follower in response to movement of the flush lever from the first position to the second position.

According to yet another aspect, the present teachings provide a flush toilet comprising a main body including a bowl. The flush toilet further includes a water valve and a waste valve. The water valve is in fluid communication with the bowl and is operative for delivering a source of flush water to the bowl. The waste valve associated with a bowl opening. A flush lever is coupled to the main body and is operatively interconnected to the waste valve and the flush valve. The flush lever is moveable between a first position, a second position and a third position such that in the first position the waste valve is closed and the water valve is closed, in the second position the waste valve is closed and the water valve is open and in the third position the waste valve is open and the water valve is open.

Further areas of applicability of the present teachings will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present teachings will become more fully understood from the detailed description and the accompanying drawings, wherein.

DESCRIPTION OF VARIOUS ASPECTS

The following description of various aspects of the present teachings is merely exemplary in nature and is in no way intended to limit the invention, its application or uses.

With general reference to the drawings, a flush toilet assembly constructed according to the present teachings is illustrated and generally identified at reference character 10. In one particular application, the flush toilet assembly 10 is intended for use within a motor vehicle such as a recreational vehicle or the like. After a reading of the remainder of this detailed description, however, those skilled in the art will readily appreciate that the present teachings are not limited to such use. Rather, various of the teachings of the present teachings have applicability to other vehicle and non-vehicle applications.

Figure 13:
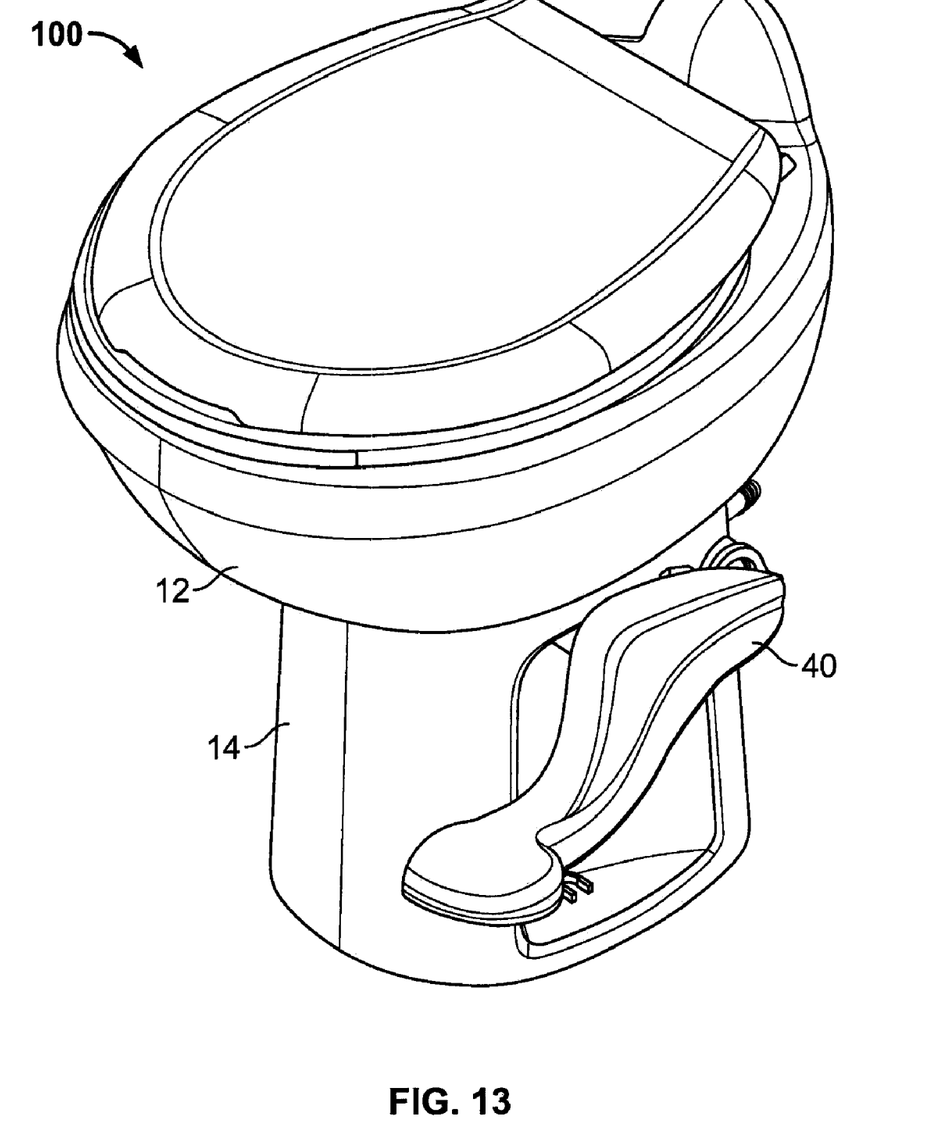
FIG. 13 is a front perspective view of another toilet assembly constructed in accordance with the present teachings.

The flush toilet assembly 10 of FIGS. 1-12C is illustrated as a low rise toilet that may be mounted on a platform. As will be discussed below with reference to FIG. 13 of the drawings, the flush toilet assembly may be alternatively constructed as a high rise toilet that may be mounted on a platform. The toilet assembly 10 is generally shown to include a bowl assembly 12 and a base 14. The bowl assembly 12 and the base 14 may be constructed of similar or dissimilar materials. The bowl assembly 12 may be constructed of a non-porous material such as vitreous china. The base 14 may be constructed of a lighter, less expensive material such as plastic.

Figure 6:
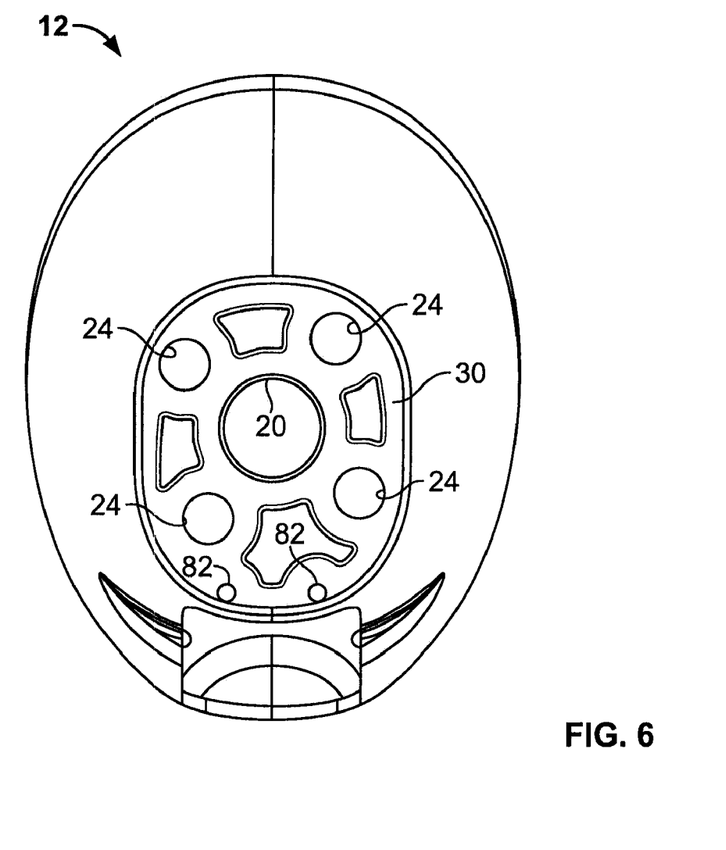
FIG. 6 is a bottom view of the bowl assembly.

The bowl assembly 12 is shown to include at its lower end a discharge outlet 20 (see, FIG. 6, for example). The upper end of the bowl assembly 12 is open to define a bowl 24. A lower end of the bowl assembly 12 is mounted to the base 14. The bowl assembly 12 may be secured to the base 14 in a manner discussed below.

Figure 1:
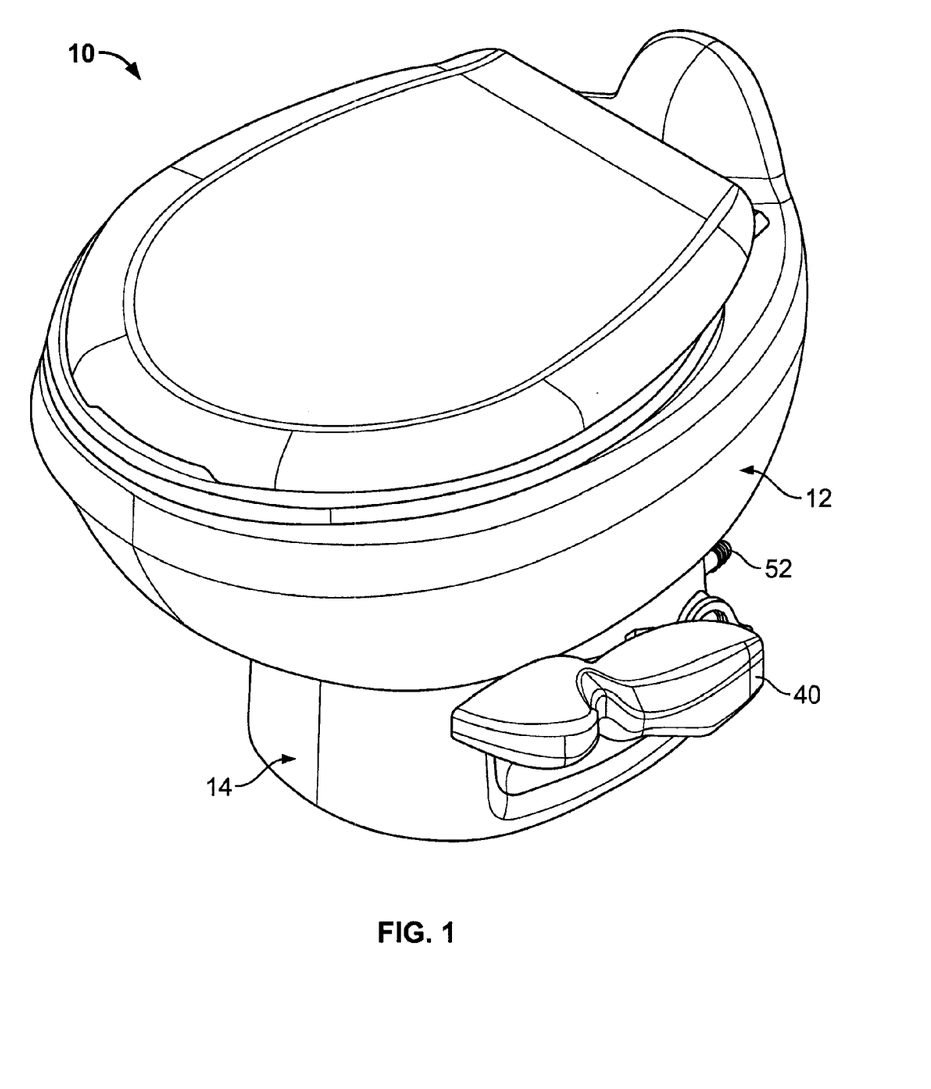
FIG. 1 is a front perspective view of a toilet assembly constructed in accordance with the present teachings.
Figure 2:
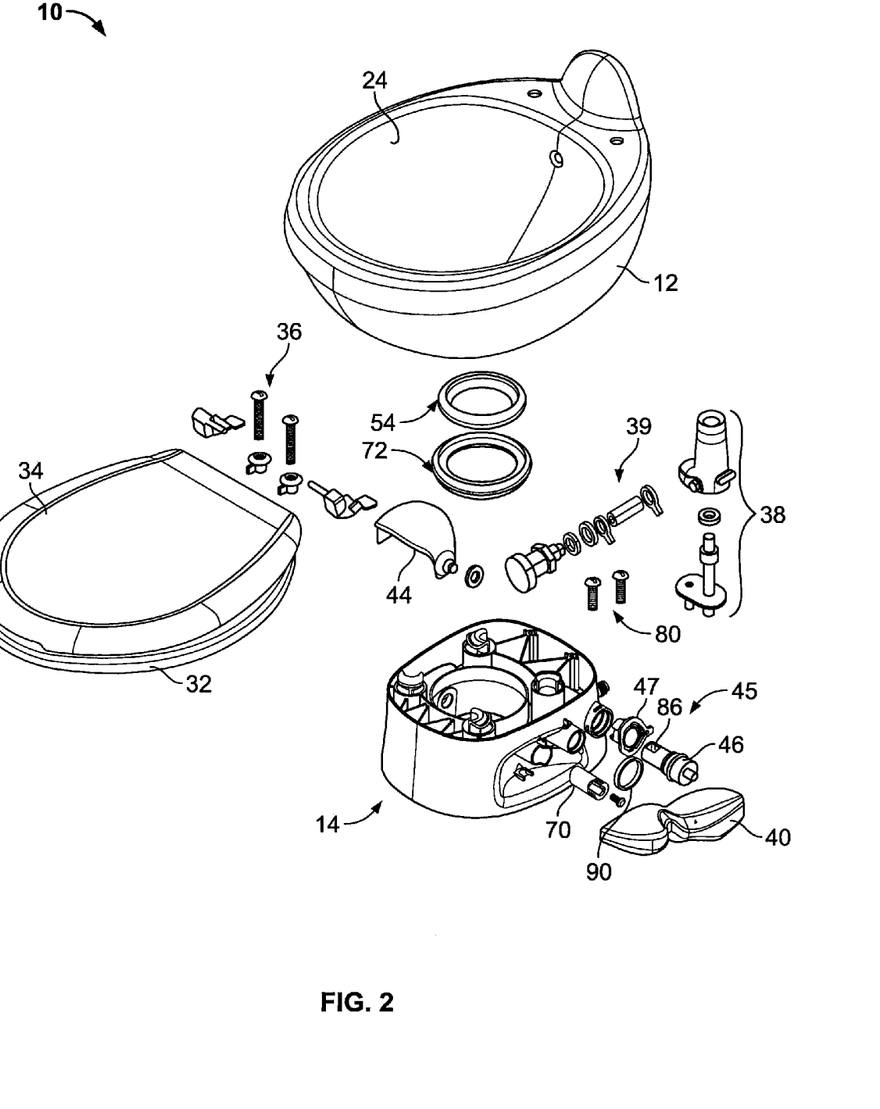
FIG. 2 is an exploded perspective of the toilet assembly of FIG. 1.

With particular reference to the exploded view of FIG. 2, the flush toilet 10 is illustrated to generally include a seat 32 and cover 34. The seat and cover 32 and 34 may be mounted to the bowl 12 with conventional mounting hardware 36. The flush toilet assembly 10 is illustrated to further include a breaker assembly 38 and a nozzle assembly 39. These features are further described in commonly owned U.S. Ser. No. 10/540,006 which is hereby incorporated by reference as if fully set forth herein.

One of the bowl assembly 12 and the base 14 may include at least one male coupling element 22. The other of the bowl assembly 12 and the base 14 may include at least one cooperating female component 24. In one particular application, the at least one male coupling element 22 is carried by the base 14 and the at least one cooperating female component 24 is carried on the bowl assembly. In this particular application, the base 14 may include four male coupling elements 22 and the bowl assembly may include four cooperating female coupling elements 24. Those skilled in the art, however, will appreciate that a greater or lesser number of male and female coupling elements 22 and 24 may be included within the scope of the present teachings.

Figure 3:
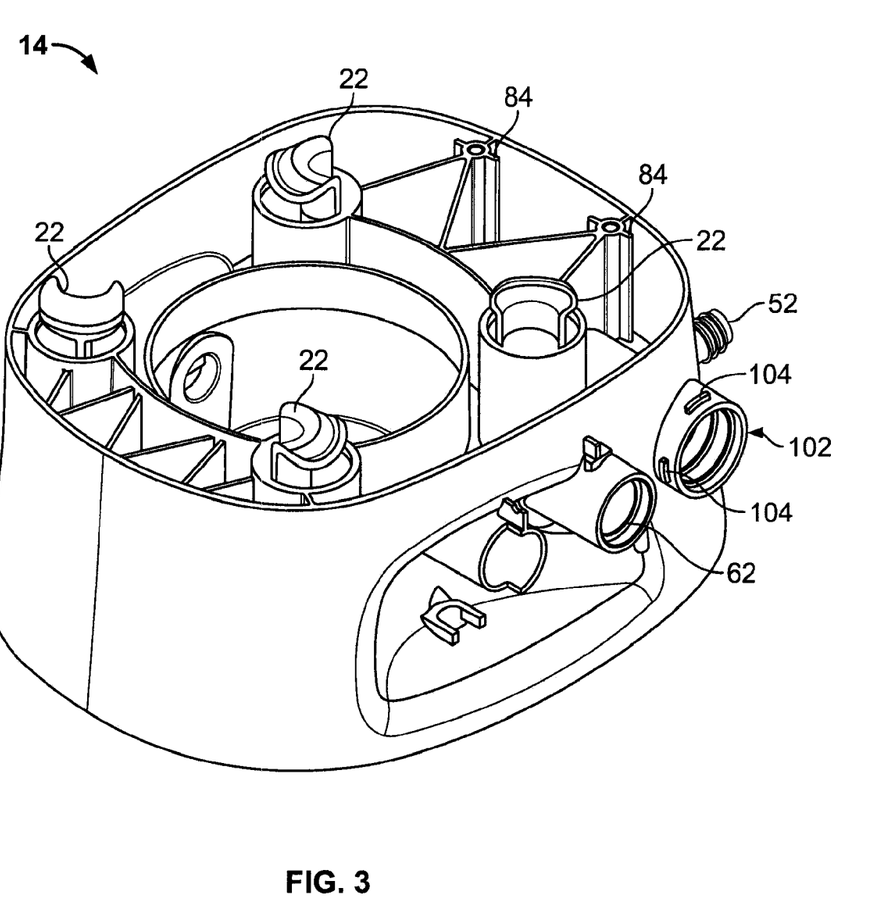
FIG. 3 is an enlarged perspective view of the base of the toilet assembly of FIG. 1.
Figure 4:
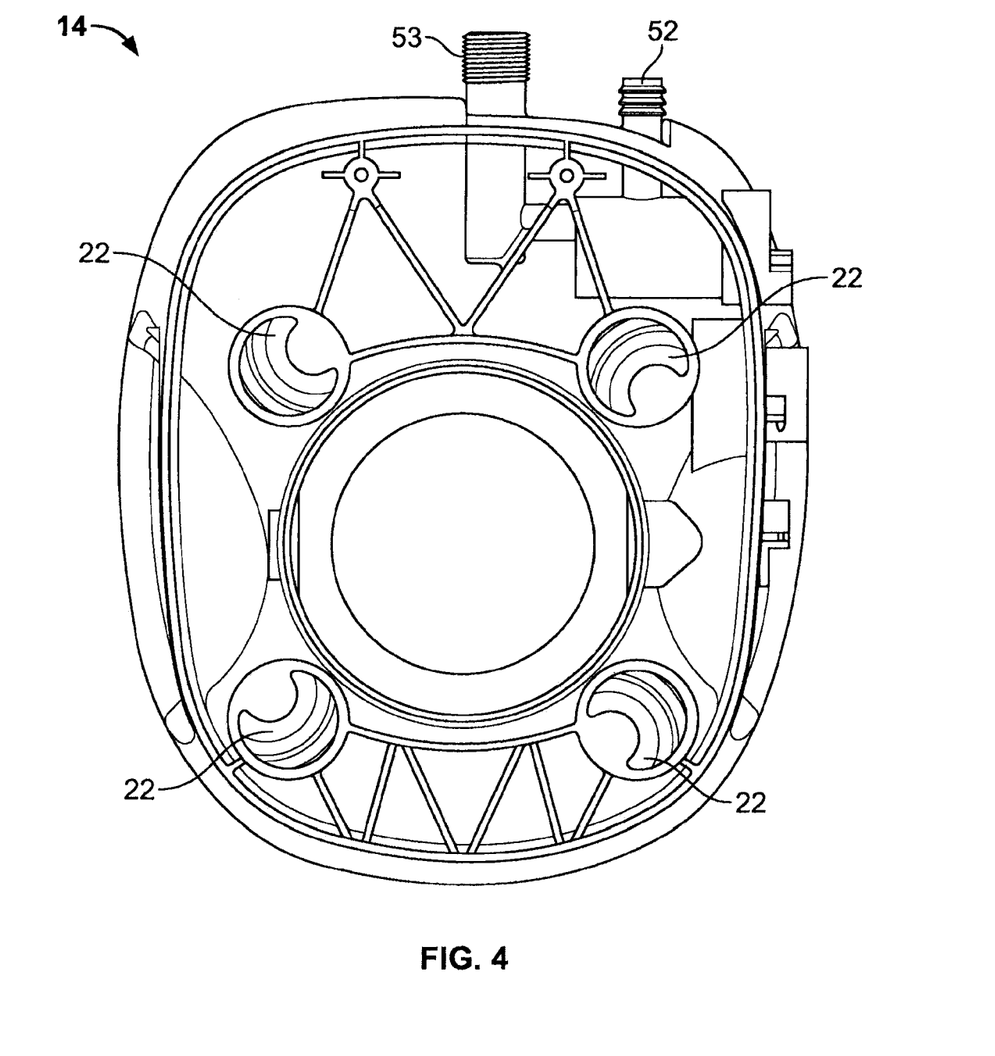
FIG. 4 is a top view of the base of FIG. 3.
Figure 5:
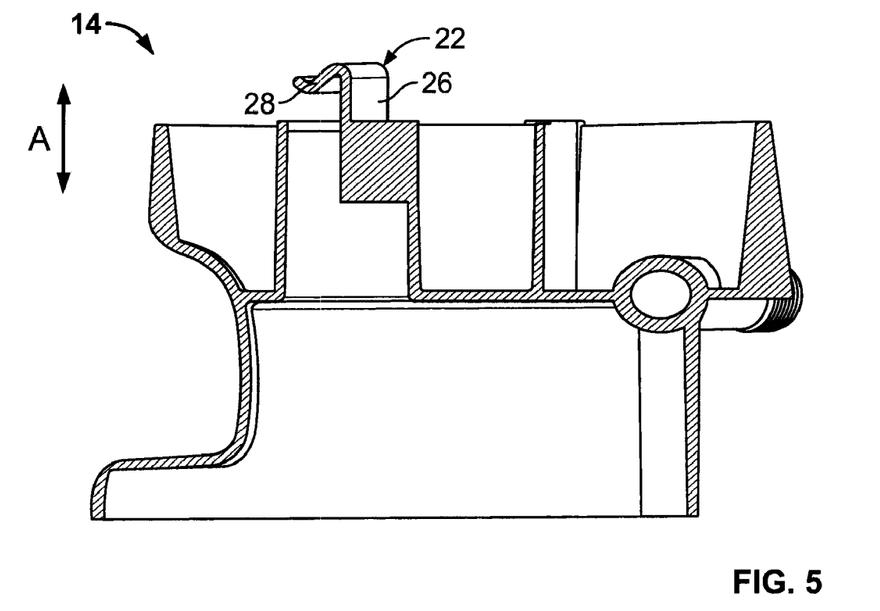
FIG. 5 is a cross-sectional view taken along the line 5-5 of FIG. 4.

With particular reference to FIG. 3-5, the male coupling elements 22 may be integrally formed with the base 14. The male coupling elements 22 may include an upwardly extending portion 26 and a retaining end 28. The upwardly extending portion 26 may be curved in a horizontal plane. In this regard, the upwardly extending portion 26 may have a cross section in a horizontal plane that circumscribes at least a portion of a circle. The upwardly extending portion 26 may be a portion of a cylindrical tube for purposes of increased strength and the retaining end 28 may extend radially from an upper end of the upwardly extending portion 26. The retaining end 28 may be compliant in a vertical direction, as indicated by double arrow A in FIG. 5. Such vertical compliance may facilitate secure attachment of the bowl assembly 12 to the base 14. The retaining end 28 may downwardly extend from the upper end of the upwardly extending portion 22 and include a lower surface having a convex shape. The convex shape of the retaining ends 28 is adapted to engage an inner surface of the bowl assembly 12.

As perhaps most particularly shown in FIG. 6, the female coupling elements may comprise apertures 24 formed in a lower surface 30 of the bowl assembly 12. The apertures 24 may be generally circular. The apertures 24 are sized and oriented to receive the male coupling elements 22 of the base 14.

With particular reference to the exploded view of FIG. 2, a seal member 54 of the flush toilet assembly 10 will be described. As will become understood by those skilled in the art, the seal member 54 provides a single element that performs the function of sealing a vitreous china bowl 24 to a plastic base 14 and also performs the function of sealing at a waste ball valve assembly 44. The sealing member 54 also functions to wipe the waste ball valve assembly 44 as the waste ball valve assembly 44 is moved from its closed position to its open position.

The seal member 54 is retained in the housing 14 by a retaining member 72. The seal member 54 may be toroidal in shape and defines a central opening. The central opening may taper in an upward direction to facilitate mating engagement with the central portion of the waste ball valve assembly 44. The seal member 54 includes an upwardly extending cylindrical flange and a lower, generally horizontal portion. In one particular embodiment, the upwardly extending cylindrical flange may be constructed of compressible foam rubber and the lower, generally horizontal portion may be constructed of generally incompressible solid rubber. The upper and lower portions may be laminated to one another.

The seal member 54 may alternatively be injection or compression molded of a common rubber material. The material of the seal member 54 may be a relatively incompressible rubber. Many suitable materials are well known in the art. The upper portion of the seal member 54 may include an open cross section to maintain the compressibility of the seal member 54 in a vertical direction.

The upwardly extending cylindrical flange is compressed between the bowl assembly 12 and the base 14 and provides a water-tight seal between the bowl assembly 12 and the base 14. Thus, a single seal member 54 may perform the dual functions of sealing the vitreous china bowl assembly 12 to a plastic base 14 and sealing/wiping at a ball valve assembly 44. The horizontal portion engages the waste ball valve assembly 44 and maintains contact with the central portion of the waste ball valve assembly 44 throughout its rotation. In this manner, the seal member 54 may provide wiping action to remove waste from the waste ball valve assembly 44.

In certain applications it may be desirable to treat the lower surface of the lower portion of the seal member 54 to reduce the effective coefficient of friction. Such a reduction of the coefficient of friction may further facilitate wiping of the central portion of the waste ball valve assembly 44. In one application, the lower surface of the lower portion is coated with Teflon. In another application, the lower surface of the lower portion is chlorinated. Other materials or treatments may be used within the scope of the present teachings to reduce the coefficient of friction.

The seal retainer 72 provides relative positioning of the seal member 54 to the central portion of the waste ball valve assembly 44. The seal retainer 72 also provides a surface against which the seal member 54 may be vertically compressed for sealing the vitreous china bowl assembly 12 to the base 14. In certain applications, the seal member 54 can be over-molded of a thermoplastic material directly to the retainer 72. Incorporation of a compliant material allows for variable fit to the bowl assembly 12 to accommodate for vitreous china processing tolerances.

During assembly, the base 14 is conventionally mounted to a support surface (e.g., a floor or riser). The bowl assembly 12 is placed on top of the base 14 such that the male coupling elements 22 are inserted into the female coupling elements 24. The bowl assembly 12 is rotated through approximately 10°-15° to the orientation shown in FIG. 1, for example. The compliant retaining ends 28 of the male coupling elements capture the bowl assembly 12. Additionally, fasteners 80 may be inserted through holes 82 in the base. The fasteners 80 may engage internally threaded boss partners 84 defined by the base 14.

Figure 7A:
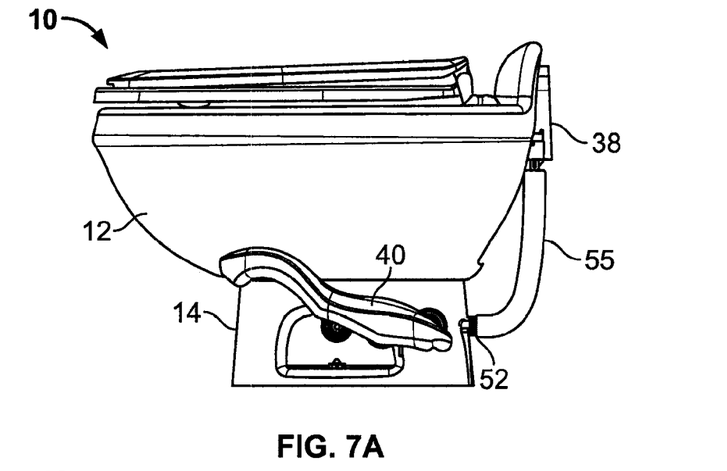
FIGS. 7A, 7B and 7C represent a series of side views of the toilet assembly of FIG. 1, shown with a flush lever in a first position (FIG. 7A), a second position (FIG. 7B) and a third position (FIG. 7C).
Figure 7B:
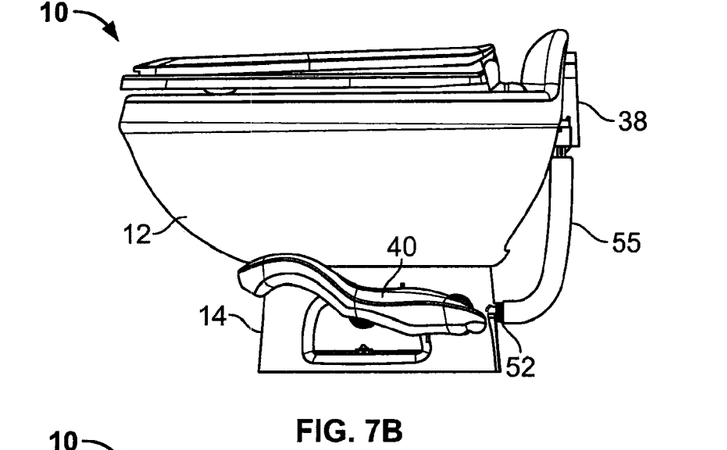
Figure 7C:
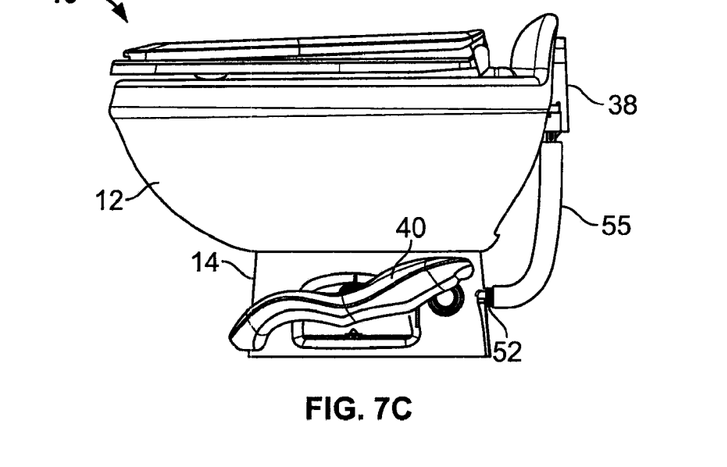

The flush toilet assembly 10 may include a flush arrangement controlled by a single actuator 40. In the embodiment illustrated, the actuator is a foot actuated lever 40. The foot actuated lever 40 is movable from a first position (as shown in FIG. 7A, for example) to a second or intermediate position (as shown in FIG. 7B, for example) downwardly pivoted about 25° from the first position. The foot actuated lever 40 may be further pivoted from the second position to a third position (as shown in FIG. 7C, for example). As will be more further discussed below, articulation of the lever 40 from the first position to the second position functions to add water to the bowl 24 without opening the discharge opening 20. Continued articulation of the lever 40 from the second position to the third position functions to selectively open the discharge opening 20 of the bowl assembly 12 and functions to selectively deliver a source of flush water to the bowl 24 of the bowl assembly 12 for flushing. It will be appreciated by those skilled in that art that various aspects of the present teachings may alternatively be employed with a hand actuated lever or an electronically controlled arrangement.

The flush arrangement may generally include a waste valve assembly 44 and a water valve assembly 45. In a manner to be discussed, the waste valve assembly 44 may be operative to selectively open and close the discharge opening 20 of the bowl assembly 12. The water valve assembly 45 may be operative for selectively delivering a source of flush water to the bowl 24 for rinsing and flushing.

The waste valve assembly may be a waste ball valve assembly 44 include a central portion in the form of a waste ball valve. The central portion may be partially spherical in shape and in a manner to become more apparent below cooperate with a seal member 54 for selectively opening and closing the discharge opening 20. The waste ball valve assembly 44 is rotatably received in the base 14. As such, the waste ball valve assembly 44 is rotatable between open and closed positions about an axis B (see FIGS. 9A, 9B and 9C).

The toilet assembly 10 may define a flush water path 50. A portion of the flush water path 50 may be internally defined by the base 14 and may extend between an inlet port 52 and outlet port 53. The inlet and outlet ports 52 and 53 may be integrally formed with the base 14. The inlet port 52 may be conventionally coupled to a source of flush water (now shown). Positive pressure of the flush water is maintained at the inlet port 52. The outlet port 53 may be conventionally coupled to the breaker assembly 38 through a conduit or hose 55 for delivering the source of matter to the nozzle assembly 39.

The water valve recess 56 (see FIGS. 9A-9C, for example) may intersect the flush water path 50 and may be generally cylindrical in shape. The water valve 46 may be similarly cylindrically shaped and received within the water valve recess 56 for rotation about an axis C.

Figure 9A:
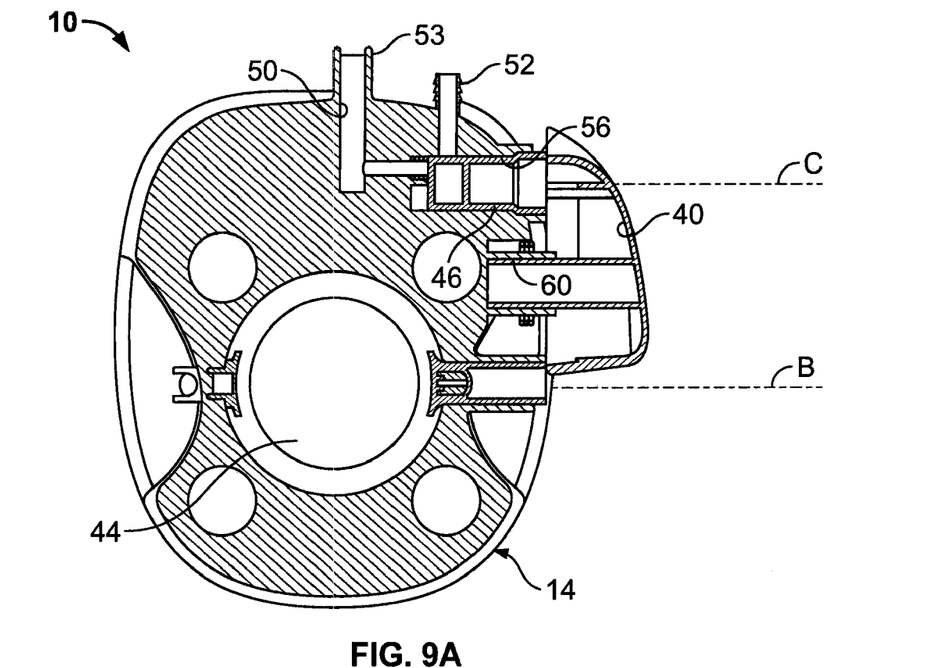
FIGS. 9A, 9B and 9C represent a series of cross-sectional views of a portion of the toilet assembly of FIG. 1, shown with the flush lever and the water valve in their respective first positions (FIG. 9A), second positions (FIG. 9B) and third positions (FIG. 9C).
Figure 9B:
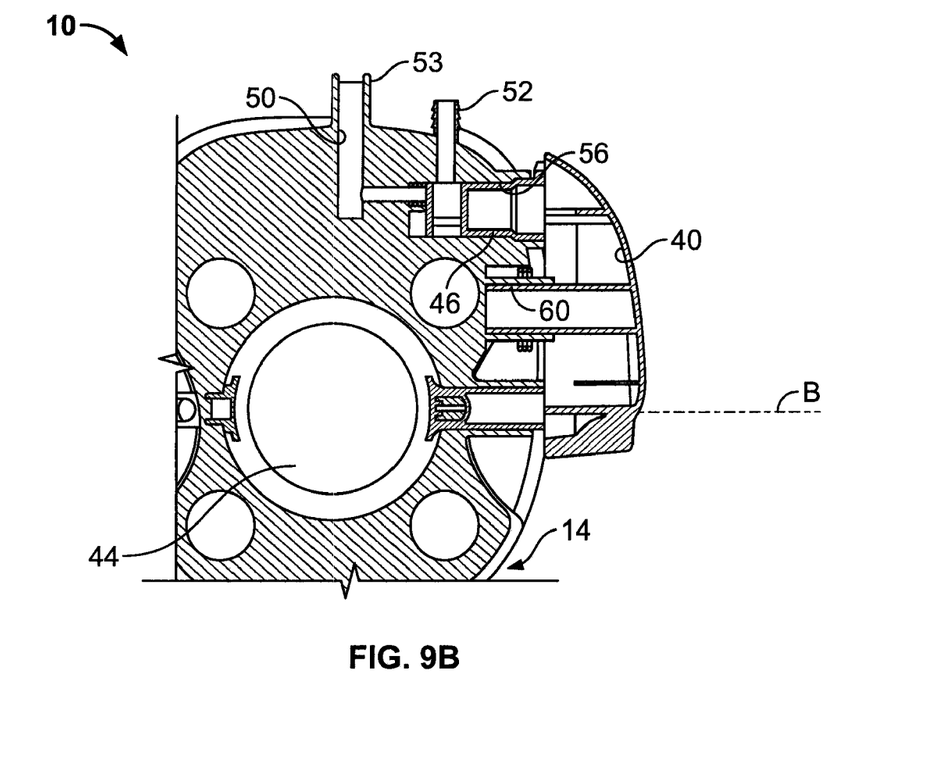
Figure 9C:
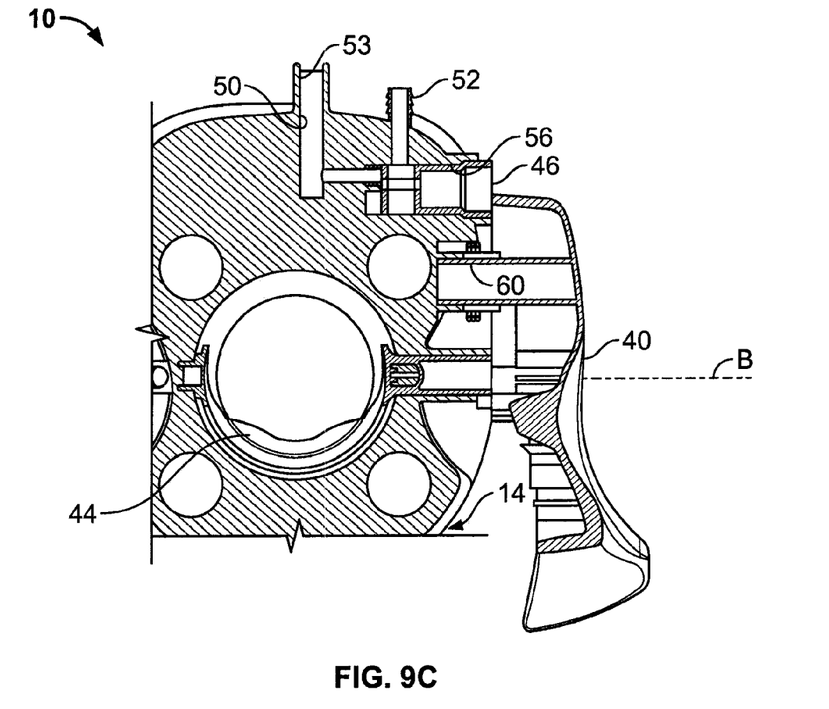
Figure 10:
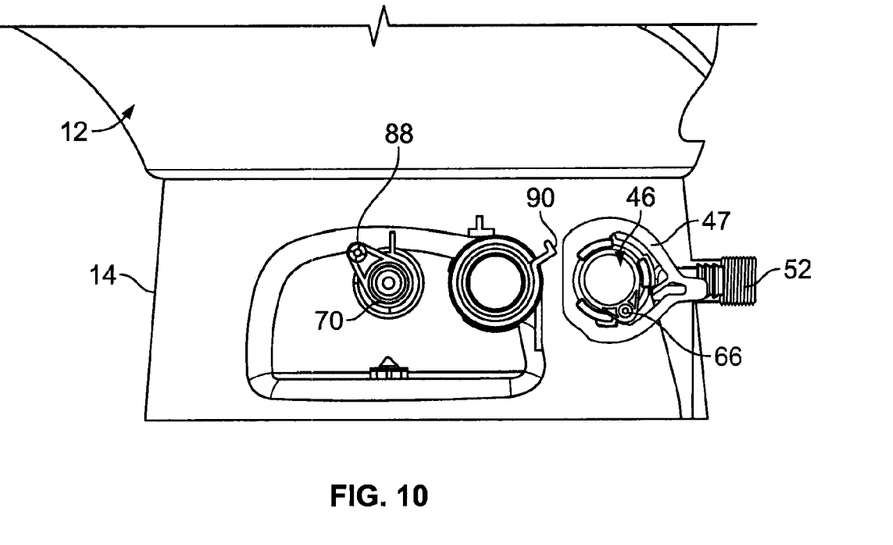
FIG. 10 is a side view of the toilet assembly of FIG. 1, shown with the flush lever removed for purposes of illustration.
Figure 11:
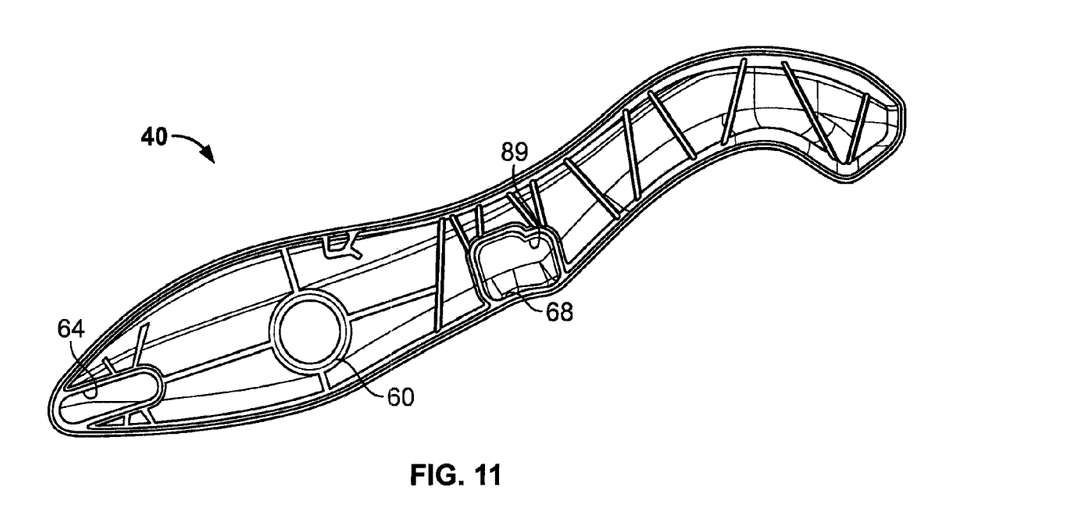
FIG. 11 is a rear view of the flush lever.
Figure 12A:
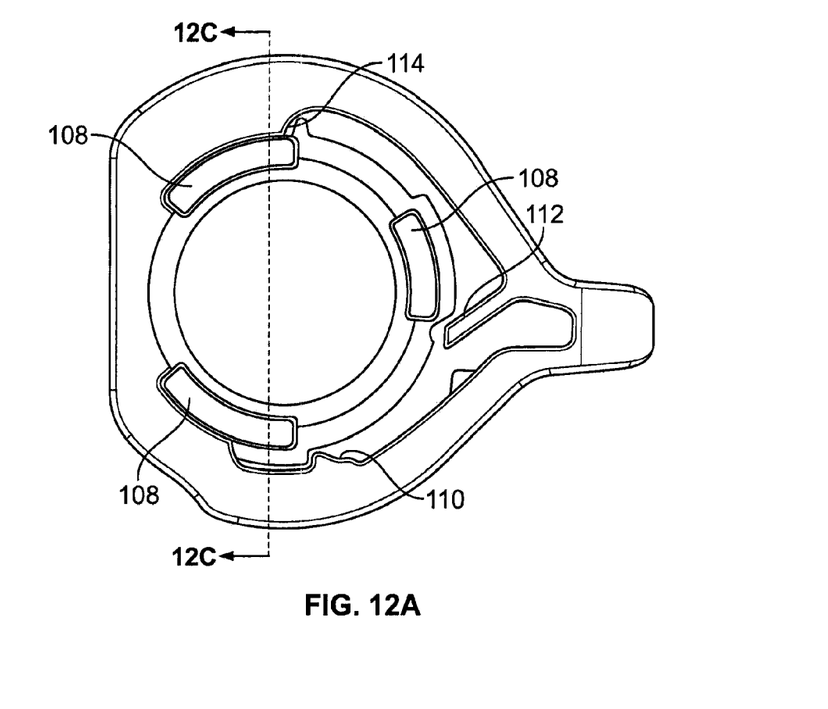
FIGS. 12A, 12B and 12C are views of a water valve mounting member of the toilet assembly of the present teachings.
Figure 12B:
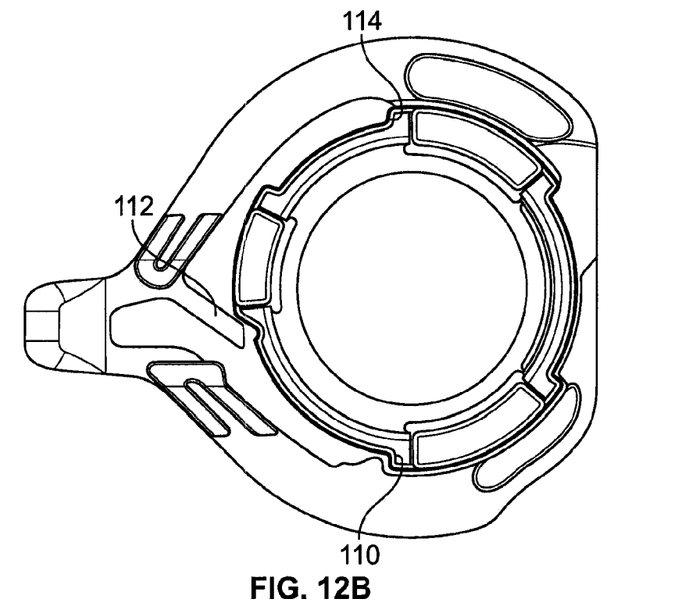
Figure 12C:
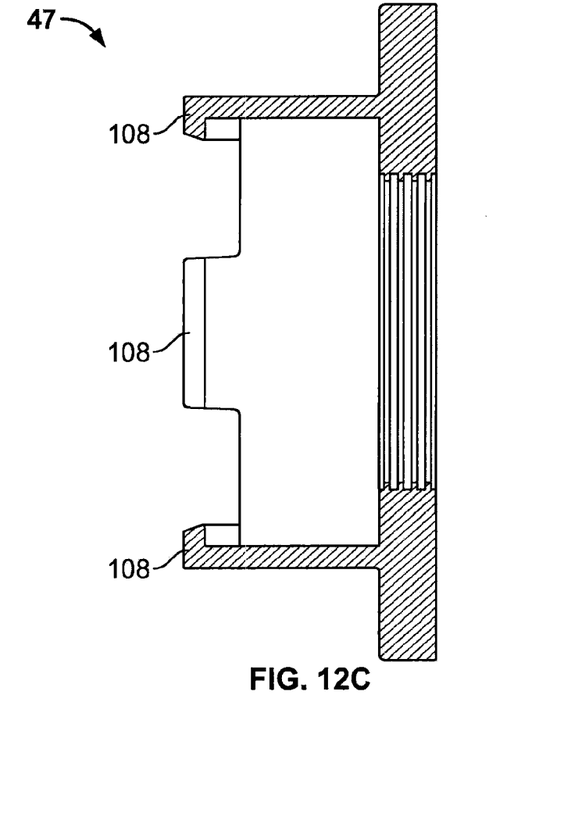

The water valve 46 is movable between a first position (shown in FIG. 9A), a second position (shown in FIG. 9B) and a third position (shown in FIG. 9C). These three water valve positions corresponding with the first, second and third positions of the flush lever 40, respectively. In the embodiment illustrated, the water valve 46 is rotatable about the axis C between the first, second and third positions. In the first position, the flush water path 50 is closed. In the second and third positions, the flush water path 50 is open for delivering the source of flush water to the bowl.

The flush lever 40 may be formed to include a generally cylindrical male extension 60 that is rotatably received within a cylindrical opening 62 defined by the base 14. The flush lever 40 may be formed to include a first recess 64 for receiving a driven portion 66 of the water valve 46. The driven portion 66 defines a cam member and the recess 64 defines a cam follower. The first recess may be an elongated slot 64. The flush lever 40 may be additionally formed to define a second recess 68 for receiving a rotatable drive member 70 coupled to the waste valve 44.

The base 14 may be further formed to include a cylindrical extension 102 for reception and mounting of the water valve 64. The cylindrical extension 102 may be formed to include a plurality of radially extending tabs 104 for cooperatively engaging the valve mounting member 47. In this regard, the mounting member 47 defines a circular opening 106 for receiving the water valve 64. The mounting member 47 in turn surrounds the cylindrical extension 102. Inwardly extending flanges 108 of the mounting member 47 engage the tabs 104 in a conventional manner to secure the mounting member 47 to the base 14.

Figure 8A:
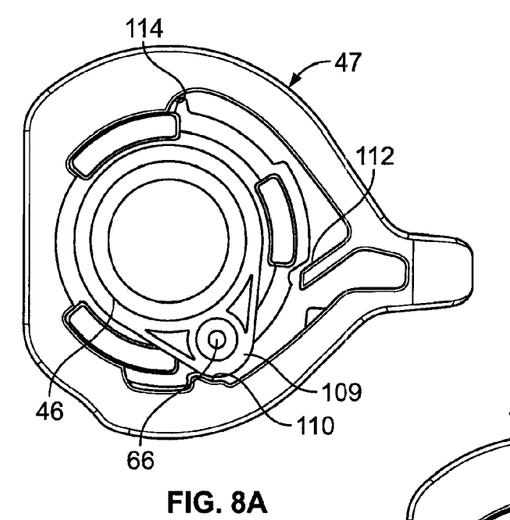
FIGS. 8A, 8B and 8C represent a corresponding series of side views of the water valve and water valve mounting member, as the water valve is rotated through first, second and third positions corresponding with the first, second and third positions of the flush lever.
Figure 8B:
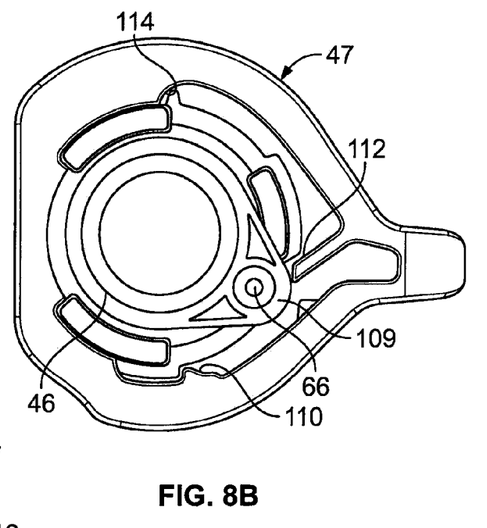

The mounting member 47 may define a plurality of stops for positively locating the flush lever 40 in the first, second and third positions. The water valve 46 may rotate relative to the mounting member between first, second and third flush valve positions corresponding to the first, second and third flush level positions 40. In the first flush valve position, a radially extending extension 109 that carries that driven portion 66 of the flush valve 64 abuts a first stop 110. The first stop 110 prevents further rotation of the water valve 46 in a clockwise direction (as shown in FIG. 8A).

In the second water valve position, the extension 109 abuts a second stop 112 of the mounting member 47. The second stop 112 may be shaped like an arm and may inwardly extend toward the extension 109. The second stop 112 provides the user with a tactile response to indicate rotation of the flush lever 40 to the second position. In this regard, the extension 109 may apply a column load on the stop 112. These cooperating components 109 and 112 may provide for a lighter bending load upon return of the pedal 40. To achieve this lighter bending load upon return, the stop 112 may angle as it extends toward the extension 109. In other applications, and as discussed below, the tactile response may be provided through the interconnection of the flush lever 40 and the waste valve 44.

Figure 8C:
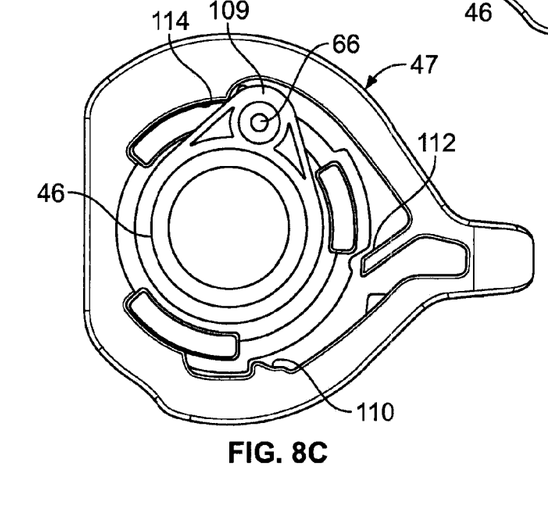

In the third water valve position, the extension 109 abuts a third stop 114. The third stop prevents further rotation of the water valve 46 in the counterclockwise position (as shown in FIG. 8C).

In operation, the flush lever 40 is rotated from the first position to the intermediate position to add water to the bowl 24 without opening the waste valve 44. During this rotation of the flush lever 40, the water valve 46 rotates from its first position to its second position and a window 86 of the water valve 46 is aligned with the flush water path 50 to open the flush water path 50 for the delivery of flush water to the bowl 24.

A driven portion 88 (see FIG. 10) of the drive member 70 may be coupled to the flush lever 40 through a lost motion connection. In certain applications, the interconnection of the drive member 70 and the flush lever 40 may provide the user with a tactile response indicating that the flush lever 40 has reached the second or intermediate position and the water valve 46 is open without opening the waste valve 44. In this regard, when the flush lever 40 is rotated to the intermediate position, the driven portion 88 may engage a detent portion 89 of the recess 68. At this point, no rotation of the waste valve 44 has occurred but the water valve 46 has been opened. Engagement of the driven portion 88 with the detent portion 89 provides a tactile response to the user. An increased amount of force is required to advance the flush lever 40 beyond this positively located position established by the driven portion 88 and the detent portion 89. Alternatively, the flush lever 40 may engage a second spring to provide additional resistance when the flush lever 40 is advanced beyond the intermediate position.

Further rotation of the lever 40 from the intermediate position to the second position results in rotation of the waste ball valve assembly 44 from its closed position to its open position. During such rotation, the water valve 46 remains open for the delivery of flush water to the bowl 24. When the user discontinues the application of force to the flush lever 40, the flush lever 40 returns to its first position by a spring 90.

Turning now to the perspective view of FIG. 12, an alternative flush toilet assembly of the present teachings is illustrated and generally identified at reference character 100. Various components are common between the flush toilet assemblies. For this reason, like reference numbers are used with reference to FIG. 15 to denote like components previously discussed. The alternative flush toilet assembly 100 of FIG. 15 again differs from the toilet assembly 10 by including a high base adapted to be mounted directly to a floor (e.g., without a riser or platform).

The description of the present teachings is merely exemplary in nature and, thus, variations that do not depart from the gist of the invention are intended to be within the scope of the invention. Such variations are not to be regarded as a departure from the spirit and scope of the invention. Furthermore, the present invention has been described with reference to two particular embodiments having many common and some distinct features. One skilled in the art will recognize that these features may be used singularly or in any combination based on the requirements and specifications of a given application or design.

What is claimed is:

1. A flush toilet comprising:
    a base;
    a flush lever having a male coupling member received in a mating recess of the base to rotatably couple the flush lever to the base for movement between a first position and a second position, the flush lever including a cam surface;
    a water valve carried to the base, the water valve including a cam follower portion extending beyond an exterior of the base so as to be directly associated with the cam surface, the water valve rotatable from a water valve closing position to a water valve open position through cooperative engagement of the cam surface and cam follower in response to movement of the flush lever from the first position to the second position; and
    a flush valve, the flush valve coupled to one end of a drive member having an opposite end that protrudes from the base so as to be coupled to the flush lever, the flush valve rotatable from a flush valve closed position to a flush valve open position in response to movement of the flush lever from the first position to the second position;
    wherein the flush valve and drive member are rotatable about a first axis and the water valve is rotatable about a second axis, the first and second axes being parallel to and spaced apart from each other and a third axis of rotation of the male coupling member.

2. The flush toilet comprising of claim 1, wherein the flush valve is a ball valve interconnected to the base.

3. The flush toilet comprising of claim 1, wherein the water valve is generally cylindrical and rotatable about the water valve closed position and the water valve open position.

4. The flush toilet comprising of claim 1, wherein the flush lever is moveable to an intermediate position, the water valve being in the water valve open position and the waste valve being in the waste closed position when the flush lever is in the intermediate position.

5. The flush toilet comprising of claim 4, further comprising a detent carried by the toilet, the detent providing a tactile response to a user upon movement to the second position.

6. The flush toilet assembly of claim 4, wherein the drive member further comprises a driven portion radially offset from the first axis, the driven portion coupled to a recess in the flush lever through a lost motion connection and configured to drive the drive member, the recess including a detent portion configured to provide a tactile response to the user when the driven portion engages the detent portion, the driven portion engaging the detent portion when the flush lever is being rotated from the intermediate position to the second position.

7. The flush toilet assembly of Claim 1, further comprising a bowl assembly supported by the base, wherein the bowl assembly and the base are constructed of distinct materials.

8. The flush toilet assembly of Claim 7, wherein at least one of the bowl assembly and the base is constructed of a non-porous material.

9. A flush toilet comprising:
    a main body including a bowl;
    a water valve in fluid communication with the bowl and operative for delivering a source of flush water to the bowl, the water valve being rotatably received in a recess formed in the main body so as to have a driven portion protruding beyond the main body;
    a waste valve associated with a bowl opening;
    a flush lever disposed adjacent an exterior of the main body and having a male extension member for rotatably coupling the flush lever to a mating recess in the main body, the flush lever operatively interconnected to the waste valve at a first portion of the flush lever that is outside of the main body and directly coupled to the water valve via the driven portion at a second portion of the flush lever that is on an opposite side of the male extension member as the first portion and outside of the main body, the flush lever moveable between a first position, a second position and a third position such that in the first position the waste valve is closed and the water valve is closed, in the second position the waste valve is closed and the water valve is open and in the third position the waste valve is open and the water valve is open; and
    a valve mounting member coupled to the main body adjacent the flush lever and having an opening for receiving the driven portion therethrough, the mounting member defining a plurality of stop portions for positively locating the flush lever in each of the first, second and third positions.

10. The flush toilet assembly of claim 9, wherein an interconnection between the flush lever and at least one of the waste valve and water valve provides a user with a tactile response after the flush lever is rotated to the second position and before the flush lever is rotated to the third position.

11. The flush toilet assembly of claim 9, wherein the water valve includes a generally cylindrical shape and the water valve recess includes a complimentary cylindrical shape sized to rotatably receive the water valve therein.

* * * * *